United States Patent
Borenstein et al.

(10) Patent No.: US 8,832,203 B2
(45) Date of Patent: Sep. 9, 2014

(54) SINGLE TOUCH E-MAIL MANAGEMENT

(75) Inventors: Nathaniel Solomon Borenstein, Ann Arbor, MI (US); Mark Edmund Maresh, Bath, MI (US)

(73) Assignee: International Business Machines Corporation, Armonk, NY (US)

( * ) Notice: Subject to any disclaimer, the term of this patent is extended or adjusted under 35 U.S.C. 154(b) by 1236 days.

(21) Appl. No.: 12/247,820

(22) Filed: Oct. 8, 2008

(65) Prior Publication Data

US 2010/0088379 A1   Apr. 8, 2010

(51) Int. Cl.
| | | |
|---|---|---|
| G06F 15/16 | (2006.01) |
| G06F 3/00 | (2006.01) |
| G06Q 10/10 | (2012.01) |
| G06F 9/44 | (2006.01) |
| H04L 12/58 | (2006.01) |

(52) U.S. Cl.
CPC ............ *G06Q 10/107* (2013.01); *G06F 9/4443* (2013.01); *H04L 51/18* (2013.01)
USPC ............ 709/206; 709/204; 715/744; 715/747

(58) Field of Classification Search
CPC ............................................. H04L 51/00–51/38
USPC ............................. 709/204–206; 715/744–747
See application file for complete search history.

(56) References Cited

U.S. PATENT DOCUMENTS

| | | | |
|---|---|---|---|
| 6,493,007 B1 * | 12/2002 | Pang | 715/835 |
| 6,545,669 B1 | 4/2003 | Kinawi et al. | |
| 6,704,031 B1 * | 3/2004 | Kimball et al. | 715/745 |
| 6,813,591 B1 | 11/2004 | Ohwi | |
| 6,980,312 B1 | 12/2005 | Czyszczewski et al. | |
| 7,770,121 B2 * | 8/2010 | Jain et al. | 715/744 |
| 2002/0169840 A1 * | 11/2002 | Sheldon et al. | 709/206 |
| 2003/0135555 A1 * | 7/2003 | Birrel et al. | 709/206 |
| 2003/0135565 A1 * | 7/2003 | Estrada | 709/206 |
| 2005/0108332 A1 * | 5/2005 | Vaschillo et al. | 709/206 |
| 2006/0010217 A1 * | 1/2006 | Sood | 709/206 |
| 2006/0089931 A1 * | 4/2006 | Giacobbe et al. | 707/9 |
| 2009/0049132 A1 * | 2/2009 | Livne Gutovski | 709/206 |

OTHER PUBLICATIONS

Smith et al., "Eliciting Reactive and Reflective Feedback for a Social Communication Tool: A Multi-Session Approach", DIS2004, Aug. 1-4, Cambridge, Massachusetts. 2004 ACM, pp. 39-48.

* cited by examiner

*Primary Examiner* — Tae Kim

(74) *Attorney, Agent, or Firm* — Yee & Associates, P.C.; Steven L. Bennett

(57) ABSTRACT

Responsive to receiving a user input to perform an email action on a selected email, a number of single touch buttons are displayed in association with the selected e-mail. Further, a plurality of operations associated with the single touch button on the selected e-mail is executed, wherein the plurality of operations manipulate the selected e-mail.

9 Claims, 9 Drawing Sheets

FIG. 10

| Who ∧ | | Date ∨ | Time | Size ∨ ∧ | Subject ∧ |
|---|---|---|---|---|---|
| ▽ High Importance | | | | | |
| John Smith | ✎ | 12/22/2005 | 01:48 PM | 17,383 ○ | Re: 4100 |
| ▽ Normal | | | | | |
| John Smith | ✉ | 04/20/2006 | 09:19 AM | 960 | Link |
| John Smith | ✉ | 04/20/2006 | 09:17 AM | 2,102 | Testing Link |
| ▽ Closed | | | | | |
| John Smith | ✉ | 04/19/2006 | 10:18 AM | 2,317 | Test Note |

1006

SINGLE TOUCH E-MAIL MANAGEMENT

BACKGROUND OF THE INVENTION

1. Field of the Invention

The present invention relates generally to a data processing system and in particular to a method and apparatus for managing e-mail applications. Still more particularly, the illustrative embodiments are directed to a computer implemented method, and computer usable program product for structuring an e-mail with options and settings that allow e-mail management functions to be mostly designated and executed within each individual e-mail.

2. Description of the Related Art

E-mailing is one of the most utilized methods of communication. In addition to sending and receiving e-mails, e-mail applications are meant to assist a user with organization and time management. However, many inefficiencies still remain with current e-mail applications. Current e-mail applications lack easily accessible settings to manage e-mails on the e-mail interface. Additionally, current e-mail applications often require multiple steps for certain e-mail management functions, even though this e-mail management process could be simplified by integrating these functions more directly into a user's e-mail application.

BRIEF SUMMARY OF THE INVENTION

The illustrative embodiments provide a computer implemented method, apparatus, and computer program product for organizing e-mails. In one embodiment, responsive to receiving a user input to perform an email action on a selected email, a number of single touch buttons are displayed in association with the selected e-mail. Further, a plurality of operations associated with the single touch button on the selected e-mail is executed, wherein the plurality of operations manipulate the selected e-mail.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 10 is a pictorial representation of a screen shot of a configuration for organizing e-mails according to e-mail status in accordance with an illustrative embodiment.

DETAILED DESCRIPTION OF THE INVENTION

Figure 1:
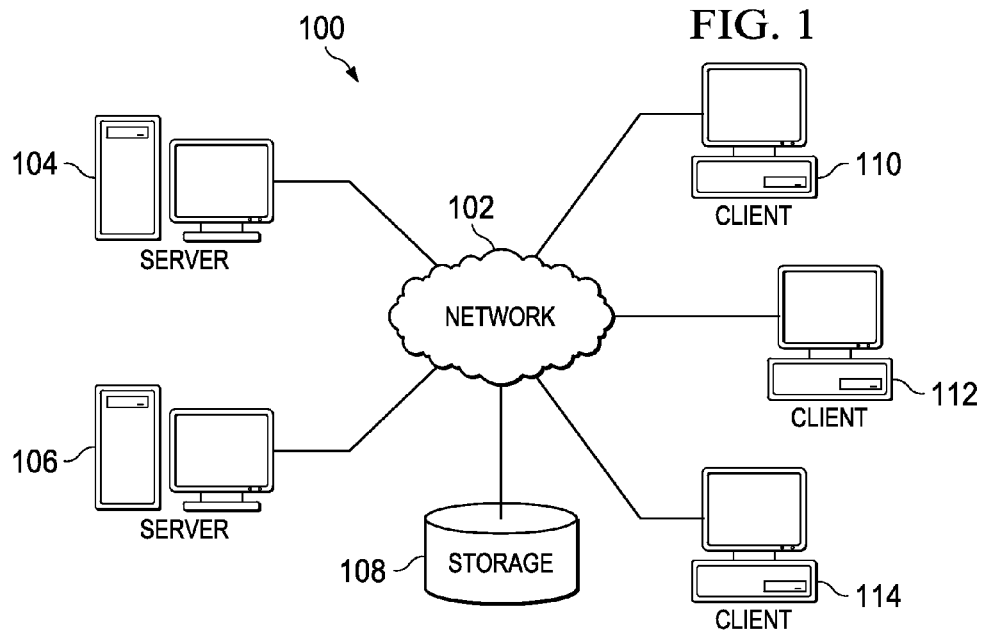
FIG. 1 is a pictorial representation of a network of data processing systems in which illustrative embodiments may be implemented.

Networked data processing system 100 is a network of computers in which different illustrative embodiments may be implemented. Networked data processing system 100 contains network 102, which is the medium used to provide communication links between various devices and computers connected within networked data processing system 100. Network 102 may include permanent or temporary connections, and wireless or land line connections. In the depicted example, servers 104 and 106 are connected to network 102, along with storage unit 108. In addition, clients 110, 112 and 114 are also connected to network 102. These clients, 110, 112 and 114, may be, for example, personal computers or network computers.

In the depicted example, server 104 provides data, such as boot files, operating system images and applications, to clients 110-114. Clients 110, 112 and 114 are clients to server 104 and 106. Networked data processing system 100 may include additional servers, clients, and other devices not shown. Clients 110, 112, and 114 may host software for organizing e-mails using a single touch e-mail management interface in accordance with an illustrative embodiment.

In the depicted example, networked data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, networked data processing system 100 also may be implemented as a number of different types of networks such as, for example, an Intranet or a local area network.

FIG. 1 is intended as an example and not as an architectural limitation for the processes of the different illustrative embodiments.

Figure 2:
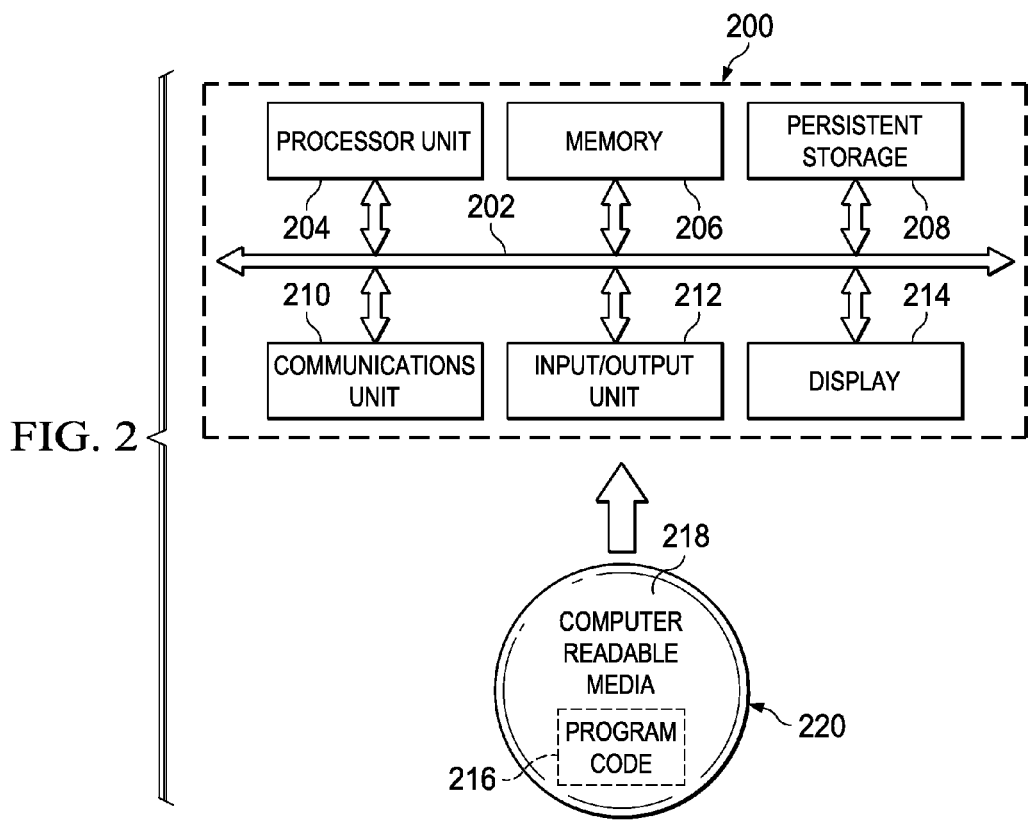
FIG. 2 is a block diagram of a data processing system in which illustrative embodiments may be implemented.

Turning now to FIG. 2, a diagram of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip.

As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices, may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208 and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments recognize that oftentimes, e-mail management systems are a critical and integral part of managing a project for a user in a business setting. The illustrative embodiments recognize that the ability to manipulate the e-mail application interface easily and efficiently is always needed. Additionally, the illustrative embodiments recognize and take into account more options are needed to allow an e-mail application to incorporate best practices in a way that reminds the user through visual cues on an e-mail management interface to follow up on tasks associated with sent or received e-mails. The illustrative embodiments also recognize that more productivity and greater organization is achieved when a set of e-mails are presented to a user where multiple operations can be applied to the e-mail with a fewer number of steps.

As a result, the illustrative embodiments recognize a need for a data processing system that is capable of organizing and managing e-mails in a more efficient and user friendly manner. Therefore, the illustrative embodiments provide a computer implemented method, computer program product, and data processing system for organizing e-mails. In one embodiment, responsive to receiving a user input to perform an email action on a selected email, a number of single touch buttons is displayed in association with the selected e-mail. As used herein, a number of items refers to one or more items. For example, a number of single touch buttons is one or more single touch buttons. Further, responsive to a selection of a single touch button from the number of single touch buttons, a plurality of operations associated with the single touch button on the selected e-mail is executed. The plurality of operations manipulate the selected e-mail. User input to perform an e-mail action on a selected e-mail may include any manipulation of a received e-mail or the creation of the new e-mail, where an e-mail management interface is presented in the body of the e-mail.

Figure 3:
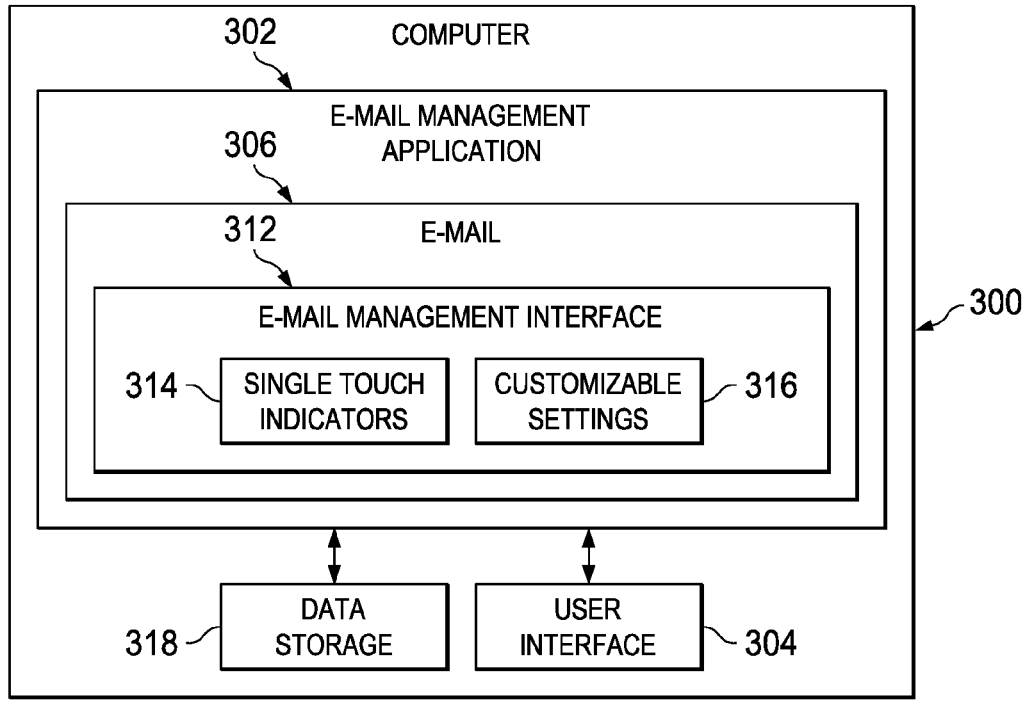
FIG. 3 is a block diagram illustrating components for organizing e-mails in accordance with an illustrative embodiment.

FIG. 3 is a block diagram illustrating components included for organizing e-mails in accordance with an illustrative embodiment. Computer 300 is displayed in FIG. 3. Computer 300 may be any type of personal computer, laptop, personal digital assistant, a server, or any other computing device depicted in FIGS. 1 and 2.

User Interface 304 is also included in FIG. 3. User Interface 304 may be any device or software application for a user to implement while editing or operating computer 300.

E-mail management application 302 may be any form of software related to managing and organizing incoming and outgoing e-mails. E-mail management application 302 is located on computer 300 and connected to a network, such as network 102 in FIG. 1. E-mail management application 302 may be used to compose, edit, send, store, and print any e-mails from one or more recipients. E-mail 306 comprises a set of e-mails stored within e-mail management application 302.

E-mail management interface 312 represents the interface associated with viewing, editing, or composing an e-mail. E-mail management interface 312 allows a user to handle processing of the e-mail in one place. E-mail management interface is also referred to as EMI. E-mail management interface 312 includes single touch indicators 314 and customizable settings 316. Single touch indicators 314 comprise a set of indicators that are configured to implement multiple operations related to e-mail management with a single selection of single touch indicators 314. The term indicator, as used herein, may be, without limitation, any form of button or selection tool that a user selects upon needing a certain feature, characteristic, or function associated with the indicator in an e-mail. Thus, single touch indicators 314 may also be termed as single touch buttons. As an illustrative example, single touch indicators, such as single touch indicators 314, may be configured upon selection to create a copy of an e-mail, provide a reminder to a user after a length of time, and to either archive or delete an e-mail after a length of time, all with a single selection of the single touch indicator. Thus, multiple operations for e-mail management are performed upon selecting an indicator that has been configured to implement the multiple operations.

E-mail management, as used herein, refers to the characteristics associated with an e-mail for both the format of the e-mail and any relevant e-mail operations. Relevant e-mail operations may include features to manipulate an e-mail such as, without limitation, copying, archiving, deleting, filing, encrypting, setting up reminders, setting up drafts, providing copies of e-mails, and signing an e-mail.

Single touch indicators 314 increase efficiency for a user in managing e-mail 306, because multiple operations may be performed on e-mail 306 without having to search through multiple screens and go through multiple steps to impose the same type of operations.

Customizable settings 316 comprise various options correlating to functions associated with e-mail management application 302. Customizable settings 316 can be added or deleted by a user to be displayed on e-mail management interface 312 as the user wishes. Customizable settings 316 includes a menu of features such as, without limitation, draft, close, copy, no copy, urgent, receipt, sign, encrypt, archive, file, and set task reminders. These settings may be pre-selected by a user to appear with either every e-mail or only with specific e-mails as designated by a user and assigned to single touch indicators 314.

Customizable settings 316 may also appear on an e-mail as a default. Rather than overwhelming users by providing every possible single-touch function to every user, the system provides the user with the ability to customize both the single-touch actions and the mechanism with which they are accessed by using buttons. Customizable settings 316 provides a user with the ability to implement relevant e-mail management functions using single-touch buttons located in the body of an e-mail.

Data storage 318 comprises a location on computer 300 for storing e-mail 306 and any configurations applied to single touch indicators 314 and customizable settings 316 on computer 300.

Figure 4:
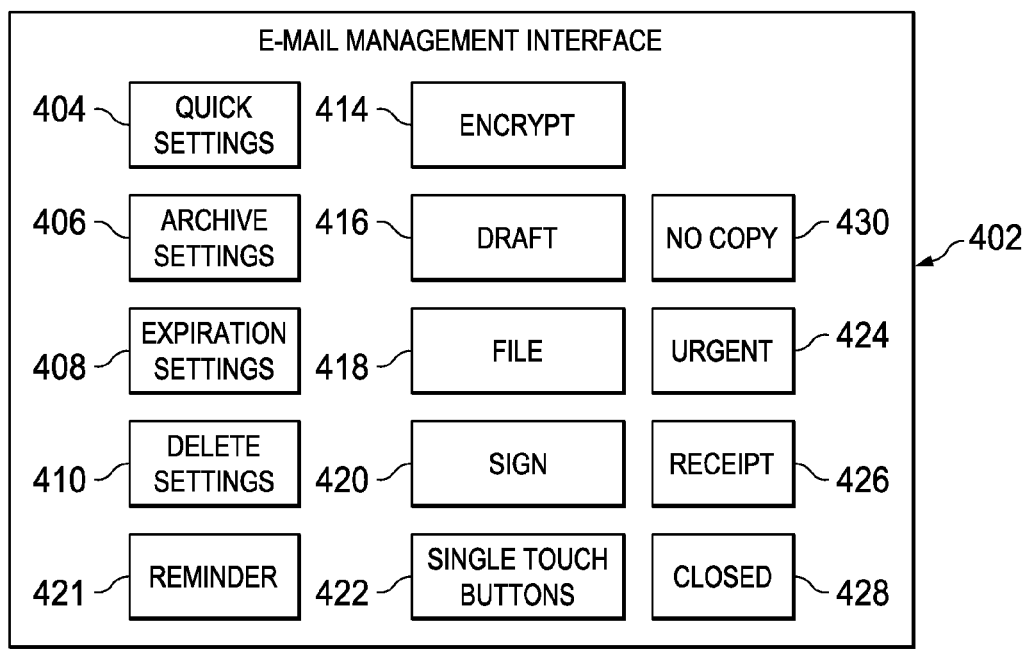
FIG. 4 is a block diagram illustrating components included in an e-mail management interface in accordance with an illustrative embodiment.

FIG. 4 is a block diagram illustrating components included in an e-mail management interface in accordance with an illustrative embodiment. FIG. 4 includes e-mail management interface 402, which is a further illustration of e-mail management interface 312 from FIG. 3.

E-mail management interface 402 represents the interface that is associated when a user is viewing, editing, and/or composing an e-mail. E-mail management interface 402 is located within the body of the e-mail, and may be located at the top of an e-mail. E-mail management interface 402 also comprises a series of settings, such as customizable settings 316 from FIG. 3, associated with functions provided to a user of e-mail management interface 402. E-mail management interface 402 may contain indicators. The term "indicators", as used herein, may apply to buttons located on e-mail management interface 402. These buttons may be connected to drop down menus containing further options corresponding to the function associated with the buttons. In other embodiments, the buttons may be associated with a pop-up menu or some other suitable interface or command system.

Quick settings 404 is included in e-mail management interface 402 in FIG. 4. Quick settings 404 allows a user to define in advance how to manage certain categories of e-mails. For example, quick settings 404 allows a user to customize the e-mail management interface 402 according to projects so that related e-mails can be processed quickly using standard default settings based on that particular project.

In this example, encrypt 414 is an indicator that a user may select to encrypt an e-mail. The term "encrypt", as used herein, comprises transforming information, also known as "plain text", and using an algorithm to make the information unreadable, except to those possessing special knowledge for decrypting the information.

No Copy 430 is an indicator that may be selected if a user does not want to keep a copy of a sent e-mail. No Copy 430 is not an option that is available for a received e-mail.

Archive settings 406 refers to settings associated with storing or saving an e-mail. Archive settings 406 may be applied while either sending or receiving e-mails. Archive settings 406 includes an indication from a user whether to store or save a current e-mail, a base e-mail, or a thread. Archive settings 406 also allows a user to indicate which databases on a computer to select for archiving an e-mail.

In this illustrative example, draft 416 is a setting that allows a user to select whether an e-mail is a draft of an e-mail prior to sending the e-mail. Urgent 424 is a setting that a user may select upon either receiving or sending an e-mail. If urgent 424 is selected upon receiving an e-mail, then the e-mail is specially marked by a change in color or another symbol to indicate to the user that this e-mail requires more attention as compared to other e-mails and has a greater degree of priority. If urgent 424 is selected upon sending an e-mail, then the e-mail is specially marked to indicate to the recipient that this e-mail is urgent.

Expiration settings 408 is a setting that indicates to a user a date that the e-mail will expire in these illustrative examples. Expiration settings 408 may be used to either delete the e-mail at a predetermined date by selecting the delete settings 410 checkbox. Delete settings 410 provides a checkbox for deleting e-mails in which the user may set up default times for deleting an e-mail. File 418 is a setting if the user wants to file an e-mail in a folder after the e-mail is received or sent. Receipt 426 is included in an e-mail that is being sent but not an e-mail that is received. Receipt 426 allows a sender to receive notification when the recipient of the e-mail first opens the e-mail.

Sign 420 is an indicator included for sent e-mails. Sign 420 may work as a digital signature, and thus assure the recipient that the note came from the intended sender.

As depicted, closed 428 is a checkbox that is used for two purposes. If closed 428 is selected, then an e-mail is placed within a category of folders called "closed". Closed 428 indicates to a user that the e-mail is no longer something that the user needs to work on or that a project associated with the e-mail is complete. This feature allows e-mail management interface 402 to perform unique functions on a closed e-mail within a folder, such as immediate archiving.

Reminder 421 allows reminders to be set if further action is required for an e-mail. The drop down indicator relating to reminder 421 may be set up to provide a reminder to a user on a certain date and/or time.

Single touch buttons 422 are the same as single touch indicators 314, as described in FIG. 3.

Figure 5:
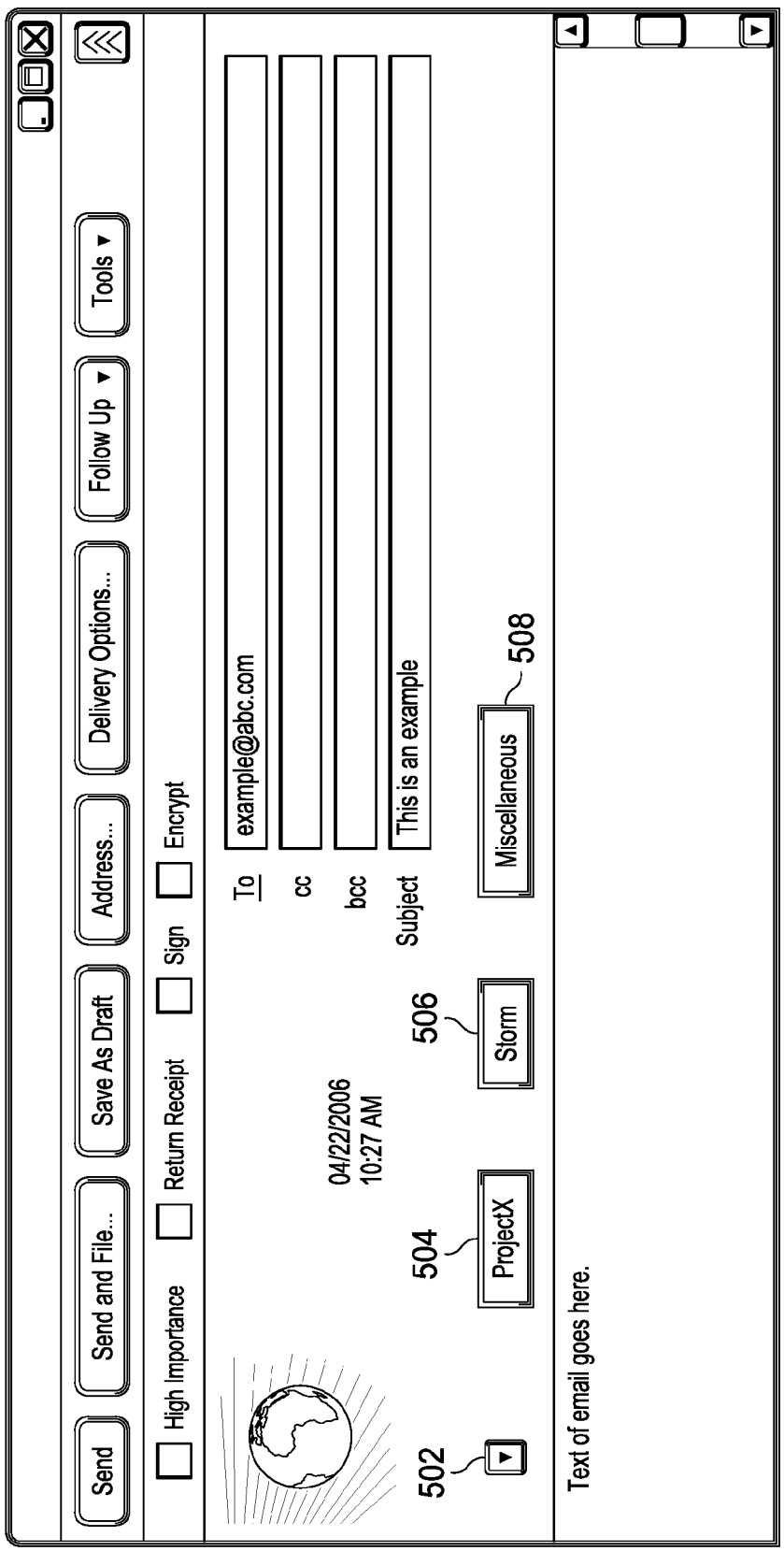
FIG. 5 is a pictorial representation of an e-mail screen shot in accordance with an illustrative embodiment.

Referring now to FIG. 5, a pictorial representation of an e-mail screen shot in accordance with an illustrative embodiment is displayed. FIG. 5 displays a basic version of an e-mail. The e-mail may be either a new e-mail that a user is creating or an existing e-mail.

FIG. 5 includes three examples of single-touch buttons. These three single touch buttons are shown in FIG. 5 as project x 504, storm 506, and miscellaneous 508. As an illustrative non-limiting example, each indicator is associated with a label. Project x 504, storm 506, and miscellaneous 508 are each examples of indicators or single touch buttons that have previously been configured to process an e-mail in a predetermined way. Project x 504 and storm 506 correspond to special projects associated with a set of e-mails. Each indicator is named by a user according to the user's preference.

A user may configure the single touch buttons, such as project x 504, storm 506, and miscellaneous 508, so that multiple e-mail operations are applied to an e-mail with a single selection of these single touch buttons. Project x 504, storm 506, and miscellaneous 508 are selected with a user interaction tool, such as a mouse or using a keyboard. This is an example only. More single touch buttons may be included.

Drop down menu 502 is a drop down menu that brings up the e-mail management interface so project x 504, storm 506, and miscellaneous 508 can be configured. Drop down menu 502 allows a user the option to either display or not display a quick settings menu. A user may be able to simply select the single touch buttons illustrated as project x 504, storm 506, and miscellaneous 508.

Figure 6:
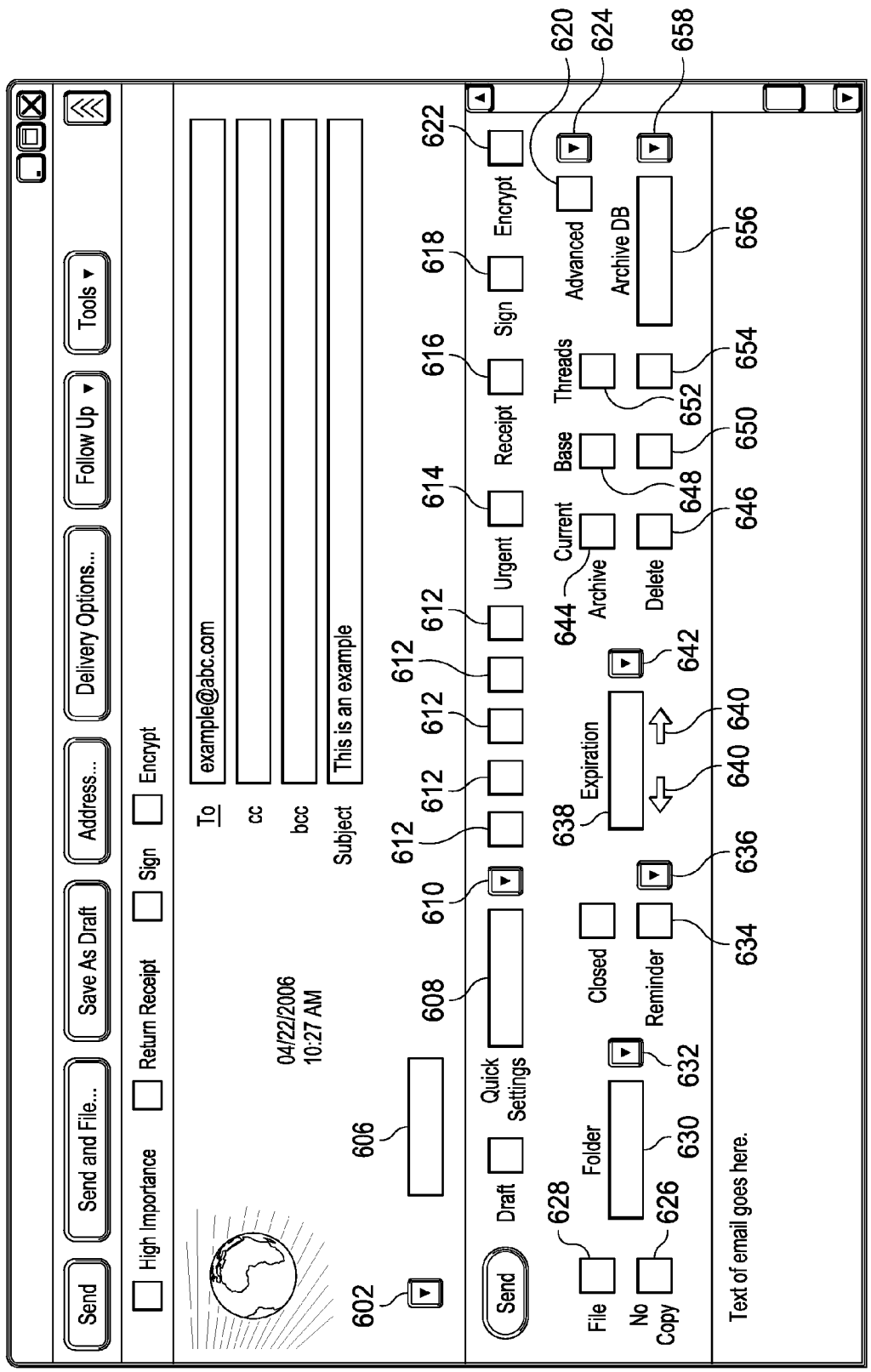
FIG. 6 is a pictorial representation of an e-mail screen shot containing configurable settings in accordance with an illustrative embodiment.

FIG. 6 is a pictorial representation of an e-mail screen shot containing configurable settings in accordance with an illustrative embodiment. The e-mail management interface displayed in FIG. 6 is comprised of various settings a user can select for configuring a forward or reply e-mail. Single touch button 606 shows an illustrative example for a single touch button, such as project x 504, storm 506, and miscellaneous 508. Single touch button 606 is included in e-mail management interface as an example of where a single touch button may be included in an e-mail with the listed settings included in FIG. 6.

Drop down menu 602 displays a menu containing more options related to managing the e-mail. Quick settings 608 is another function that allows the user to type in a name for the settings in quick settings 608. If there is an existing name, the user can select this name in quick settings 608. A pop up window will display by double clicking on the name to create or change the settings. The user will be able to assign a quick list check box to a number of checkboxes, seen as customized settings 612 in FIG. 6. Drop down menu 610 corresponds to quick settings 608 and allows a user to select a list of names to appear in quick settings 608. Customized settings 612 include five checkboxes that include a number of quick list check boxes. Any number of checkboxes may be included and determined by the user for customized settings 612. When a user selects one of the checkboxes, a name shows up in the window for quick settings 608 and the settings in the e-mail management interface are adjusted accordingly.

In one embodiment, the first checkbox from customized settings 612 included among the checkboxes for quick settings 608 will always be called default. The default checkbox included, may be implemented automatically or selected by a user in order to apply a predetermined selection of default settings to apply to a sent e-mail.

The user may select no copy 626, urgent 614, receipt 616, sign 618, and encrypt 622 in order to include these functions. Receipt 616, sign 618, and encrypt 622 would not be available checkbox options on a received e-mail. No copy 626 prevents a copy of a sent e-mail from being stored. No copy 626 would not be available for a received e-mail. In one embodiment, the default mode will be blank for these functions.

FIG. 6 includes archive checkboxes, archive current 644, archive base 648, and archive threads 652. FIG. 6 also includes delete checkboxes, delete current 646, delete base 650, and delete threads 654. The checkboxes are associated with a "current", "base", and "threads" heading. In this figure, "base" refers to an original e-mail either composed or received by a user. "Base" is equivalent to the "parent" of an e-mail chain. The term "current" refers to the most recent e-mail that a user has received. The user may choose to reply to a received e-mail, in which case, that e-mail would be the "current" e-mail. The term "threads" refers to a collection of individual messages related to each other by the reply function in an e-mail.

In a thread, the message to which a reply is sent is called the "parent" of that message. Any replies to a message are called "children" of that message. The first message in a thread is called the "root". The generational depth of a message is the number of "reply to" relationships between a message and its root. For example, all messages that are replies to the root message have a generational depth of one.

For the base e-mail, the user may select to either archive or delete by selecting archive base 648 and delete base 650, but neither is required. The archive and delete checkboxes will be tied together so that if one checkbox is selected, the other will be deselected.

For the threads e-mail, the user may choose to either archive or delete, but again, neither is required. In one embodiment, the default setting may be set to "blank".

If a user selects to archive a current, base, or threads set of e-mails using archive current 644, archive base 648, and archive threads 652, the user may select the length of time and/or location for archiving. Additionally, a default archive DB for archive DB 656 may be designated by the user. Archive DB 656 may be set by a user by selecting drop down menu 658 and thus e-mails may be archived immediately.

Advanced 620 is a checkbox associated with a drop down arrow 624. The user may select any advanced function using drop down arrow 624. Upon selecting drop down arrow 624, a menu list of advanced functions may be chosen by the user based on the e-mail system. Advanced functions may include spell check and security functions, such as encrypting. The user may select advanced 620 by selecting the checkbox associated with advanced 620. In one embodiment, the default is to not have any advanced functions applicable to an e-mail.

In one embodiment, file 628 applies to current e-mails. File 628 may be selected by the user if the user desires that a current e-mail be filed when the current e-mail is sent. If this checkbox is selected, then a folder for storing the current e-mail must be selected. In one embodiment, a folder is selected when the user types a folder name into folder 630. If no match exists based on the characters typed in, then a new folder is created. A drop down menu 632 is also associated with folder 630. Drop down menu 632 will bring up a list of potential folders to select from. If the user does not designate a folder, then the e-mail will be placed in the "sent" folder of the e-mail management application, such as e-mail management application 302 in FIG. 3.

Reminder 634 is a checkbox in FIG. 6 useful for setting a reminder concerning either a current e-mail, a base e-mail, or the threads. Reminder 634 may be specified as a number of days, weeks, months, or years checkboxes. Drop down menu 636 is included next to reminder 636 and may be selected by a user for purposes of selecting a time and date for a reminder.

Expiration 638 is associated with an expiration date. Expiration 638 is tied to the settings a user has selected for deleting an email, such as delete 646. In one embodiment, a closed email comprises an email where no further action is needed, but a user may still want to keep the email or archive an email. An expired e-mail is comprised of an email that will be deleted automatically by the system.

Arrows 640 are a set of left and right arrows which will index a date forward or backward by a predetermined time period for expiration 638. Drop down menu 642 is a drop down menu that brings up a calendar to change an exact date.

Figure 7:
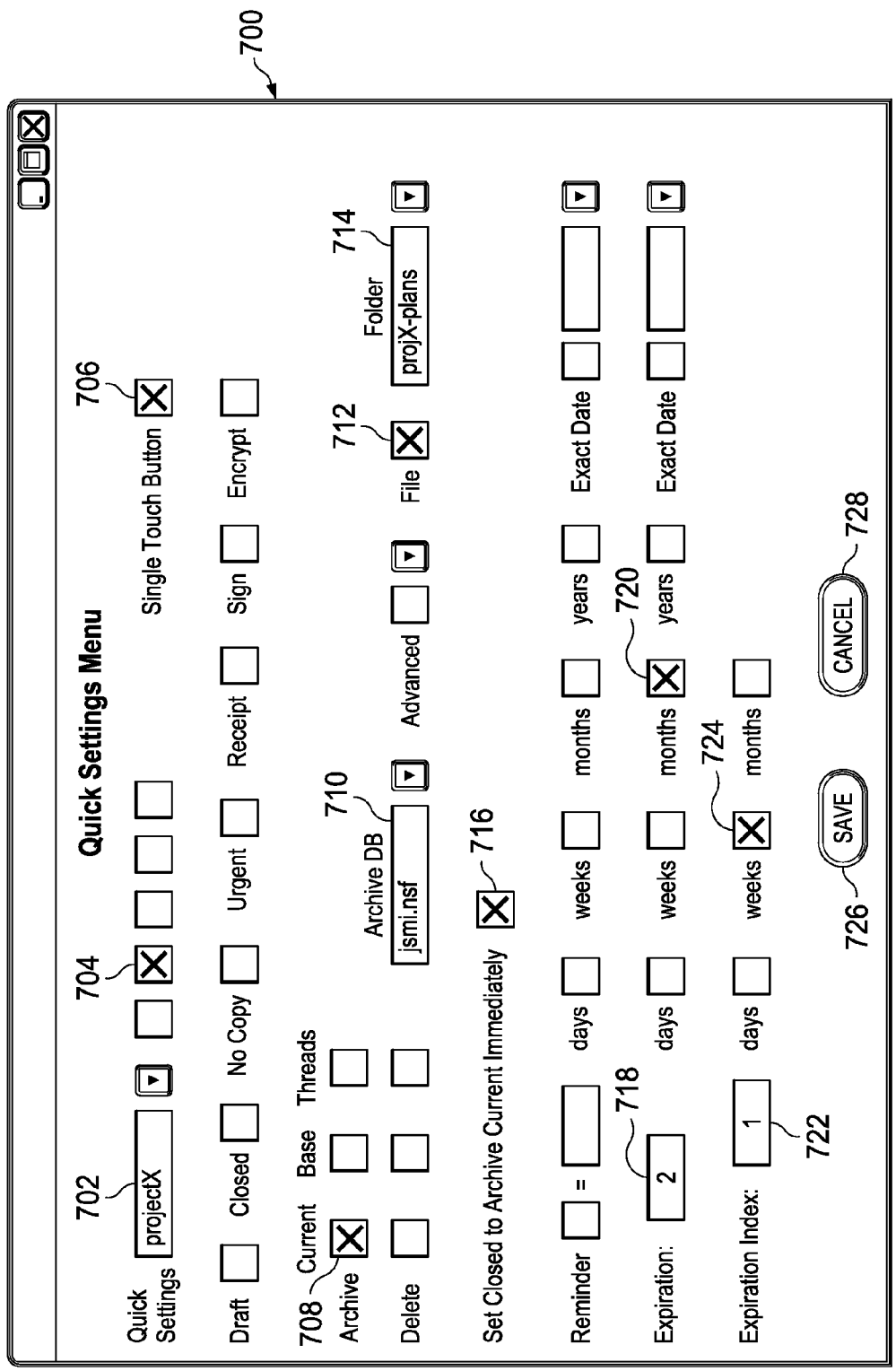
FIG. 7 is a pictorial representation of a screen shot of a quick settings menu in accordance with an illustrative embodiment.

FIG. 7 is a pictorial representation of a screen shot of a quick settings menu in accordance with an illustrative embodiment. FIG. 7 depicts a further embodiment of a quick settings menu, such as, quick settings 608 and the drop down menu 610 or quick settings select buttons 612 in FIG. 6. Quick settings menu 700 enables a user to pre-set any configurations or settings for any project.

Quick settings menu 700 allows a user to enable certain settings that will be applied to any e-mail once a user selects a single touch button that is programmed to store these settings, such as project x 504 and storm 506 from FIG. 5. Additionally, quick settings 700 enables a user to set up project names as seen in project x 702. A user may set up a reminder according to days, weeks, months, and years. A user may also set up expiration dates according to days, weeks, months, years as seen by expiration days 718, expiration months 720 and the expiration index 722 and expiration index 724. Expiration index 722 and expiration index 724 refer to input of a length of time of at least one day, so that the expiration date can be indexed forward and back in a setting such as expiration 640 from FIG. 6. When using expiration index 722 or expiration index 724, the user will put a time period in the window and then select the days, weeks, or months checkbox. A default time could be one month. Quick Settings menu 700 additionally enables a user to select the exact date using a drop down menu.

Further, a user may enter in a default time for either a reminder to be set up or for the e-mail to expire. Quick list checkboxes 704 is an example of a quick list checkbox. Quick list checkboxes 704 allows a user to select a box and assign a quick setting name, such as "project X" in quick settings box 702.

Quick settings menu 700 also contains save 726 for saving all changes and cancel 728. Save 726 allows a user to save all changes and cancel 728 allows a user to back out of the quick settings menu without changes. A user is able to make multiple changes to quick settings menu 700 without exiting from an e-mail.

Quick settings 700 includes single touch button 706, as shown in project x 504, storm 506, and miscellaneous 508 in FIG. 5. Single touch button 706 is used to create single-touch buttons that applies the actions of the current quick setting to the e-mail being viewed or created. Single touch button 706 turns even a very complex set of actions into a single button click for each e-mail being viewed or created.

FIG. 7 includes "set closed to archive current immediately 716". Set closed to archive current immediately 716 applies to an e-mail that is both current and set to be closed. Set closed to archive current immediately 716 allows a user to archive a current closed e-mail when the e-mail is sent or received. Otherwise, the closed e-mail is archived or deleted as a normal e-mail. The default is left blank.

Archive 708 allows for a user to select to archive a current e-mail for project X 702. Archive DB 710 allows a user to specify a location where the e-mail may be archived. File 712 allows a current e-mail to be filed when sent. If this checkbox is selected, then a folder must be selected by typing in the folder name in the folder window, folder 714. A list of potential names will be brought up for a user to select from. Additionally, a user may use the drop down arrow to select a folder or create a folder. The default setting would be for an email to be kept in the sent folder of the e-mail system.

Figure 8:
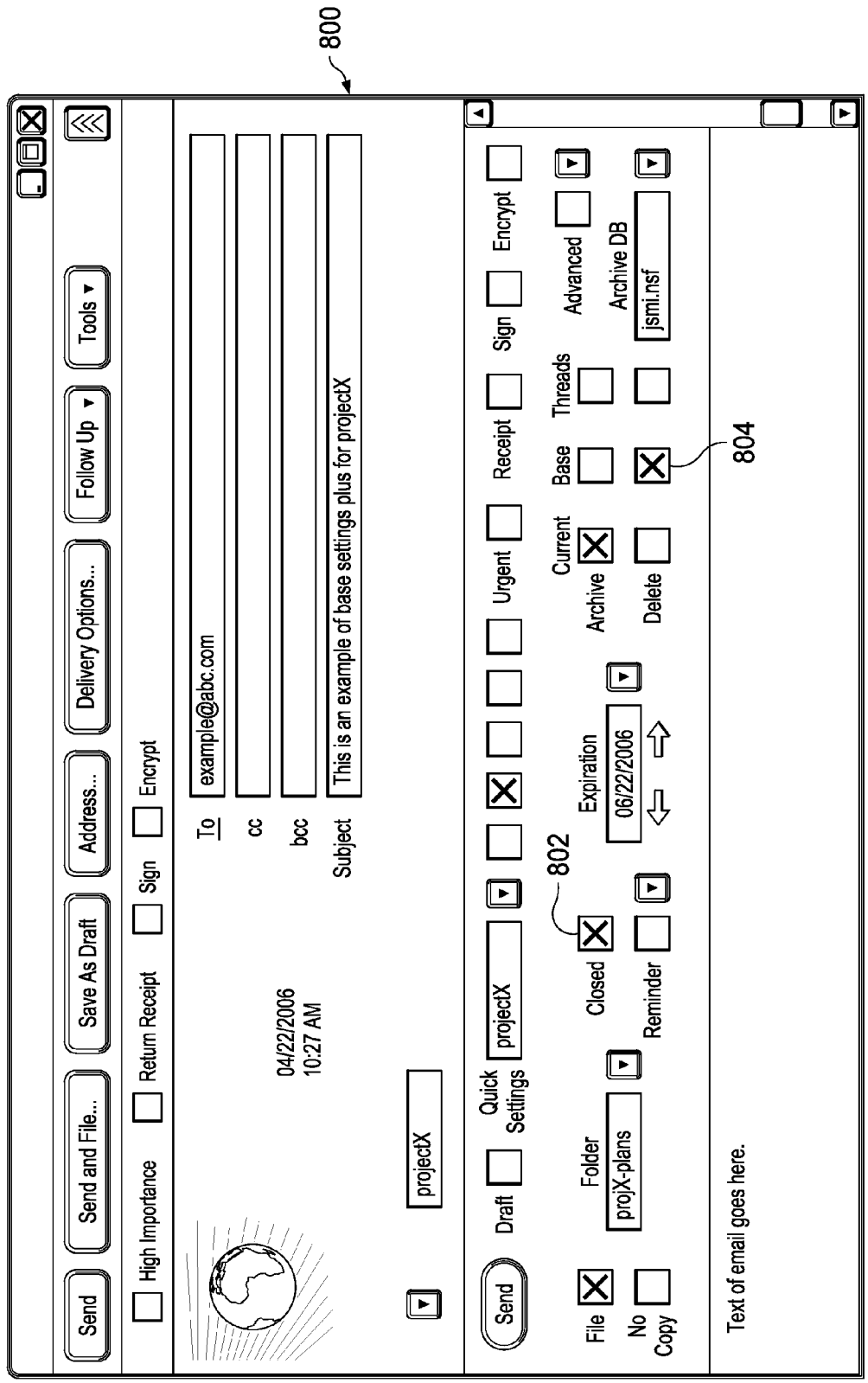
FIG. 8 is a pictorial representation of a screen shot of a sent e-mail using the e-mail management interface in accordance with an illustrative embodiment.

FIG. 8 is a pictorial representation of a screen shot of a sent e-mail using the e-mail management interface in accordance with an illustrative embodiment. FIG. 8 illustrates an embodiment of a sent e-mail that uses quick settings for the base defaults for the e-mail management interface included in FIG. 8. In this example, when a user selects the send button, this e-mail will be filed in folder "projX-plans". The e-mail will be archived in archive database "jsmi.nsf". The original (or base) e-mail is deleted since the delete checkbox has been selected.

In this embodiment, these options are set using two clicks of a user navigation tool, such as a mouse, including selecting closed 802 and delete base 804. The illustrative embodiments allow a user to organize and manage e-mails more efficiently and quickly.

Figure 9:
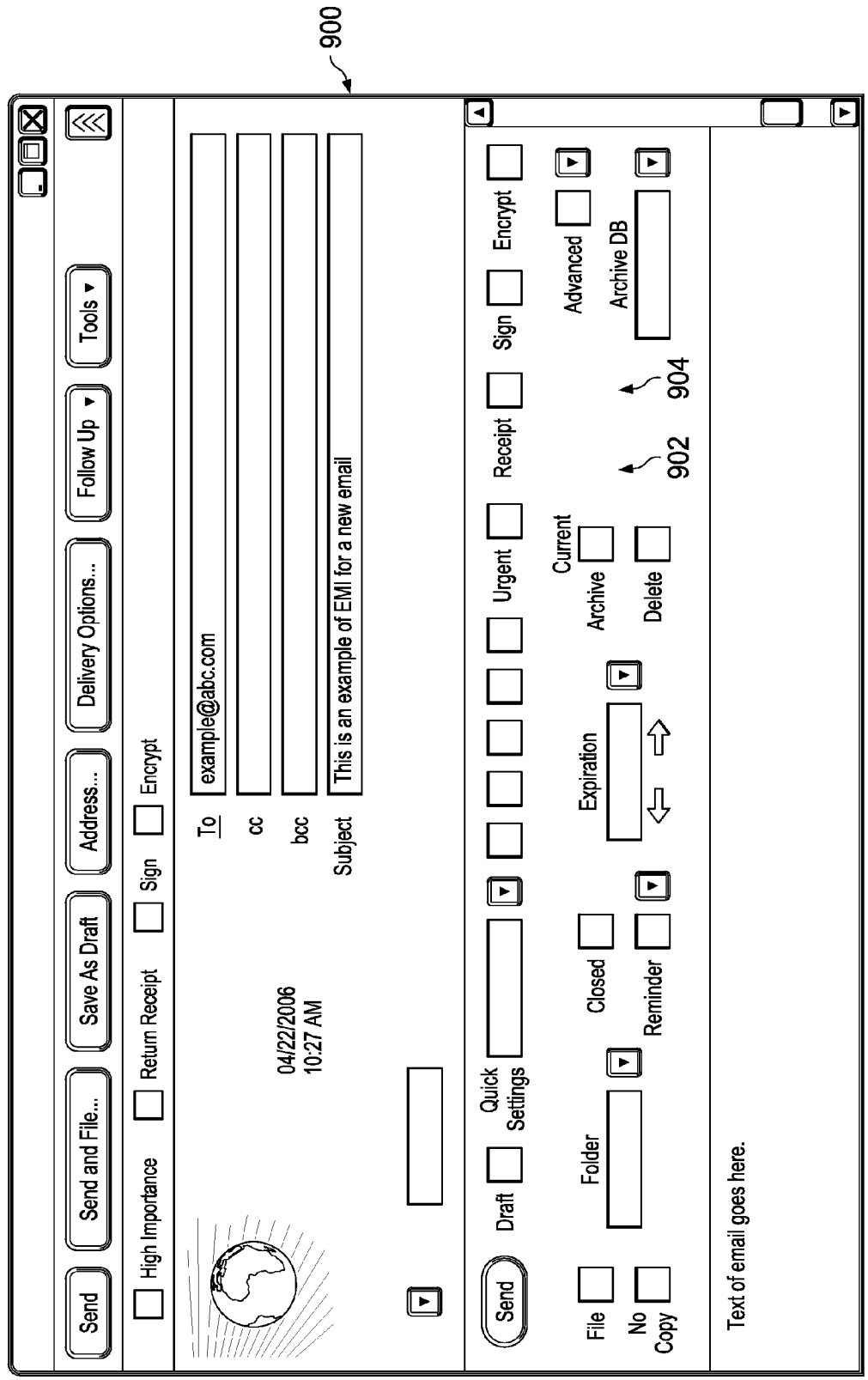
FIG. 9 is a pictorial representation of a screen shot of a newly sent e-mail using base settings in accordance with an illustrative embodiment.

FIG. 9 is a pictorial representation of a screen shot of a newly composed e-mail using base settings in accordance with an illustrative embodiment. In this embodiment, e-mail 900 and e-mail management interface 902 is similar to the e-mail management interface shown in the screen shots in FIG. 6 and FIG. 8.

The empty spaces labeled as 902 and 904 indicate that there are no archive and delete boxes checked for a base or a threads e-mail, because the base and threads e-mails are not available for a newly composed e-mail. The remaining functions, however, are the same as a forward and reply sent e-mail.

FIG. 10 is a pictorial representation of a screen shot of a configuration for organizing e-mails according to e-mail status in accordance with an illustrative embodiment. Closed folder 1006 is included in FIG. 10. If a user selects a checkbox for closing an e-mail, such as closed 802 in FIG. 8, then the user when managing his or her e-mail would know that this particular e-mail included in closed folder 1006 no longer needs any attention.

Figure 11:
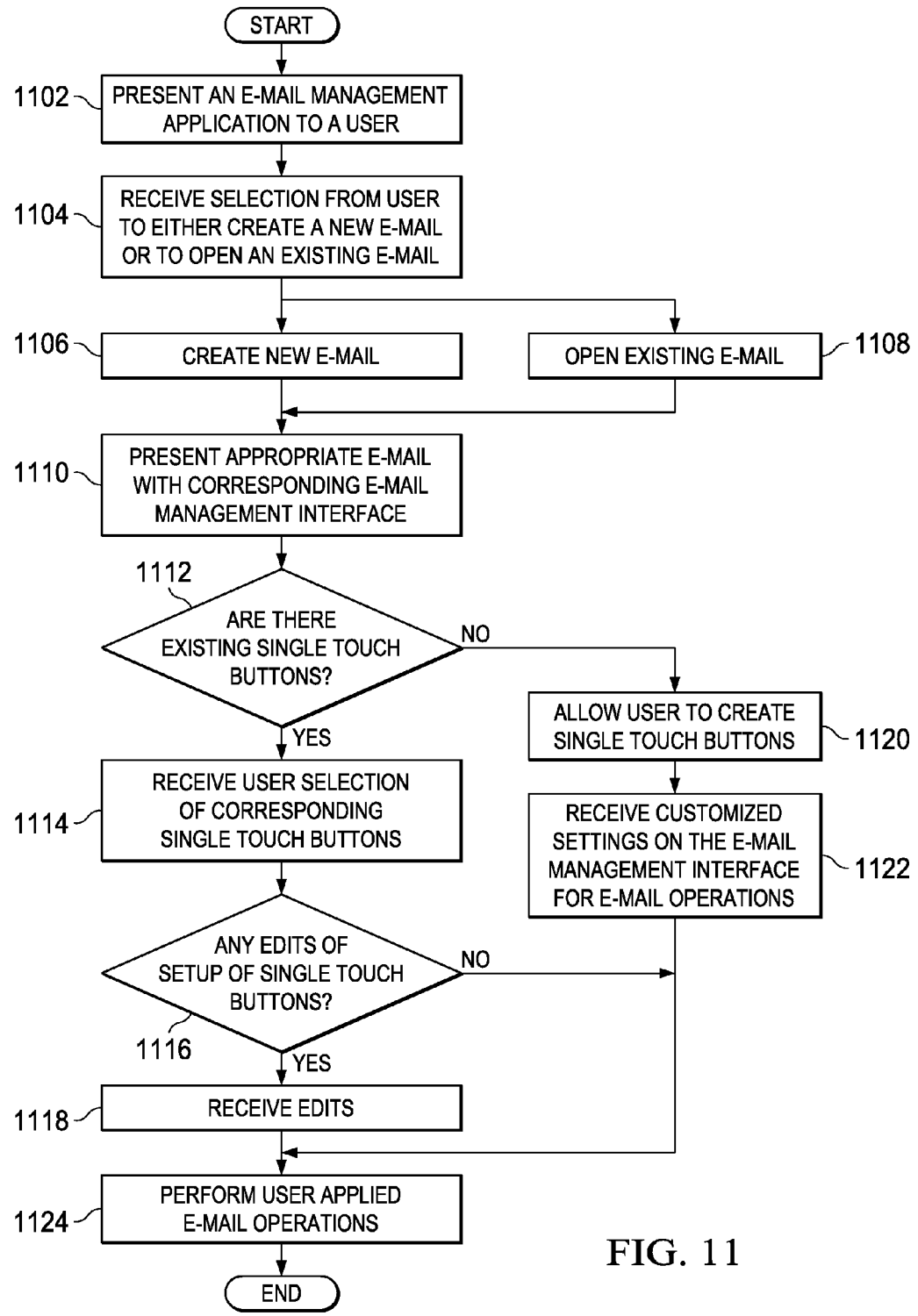
FIG. 11 is a flowchart illustrating one example of a process for organizing and managing e-mails in accordance with an illustrative embodiment.

FIG. 11 is a flowchart illustrating one example of a process for organizing and managing e-mails in accordance with an illustrative embodiment. The process begins by presenting an e-mail management application to a user (step 1102). The process then receives a selection from a user to either create a new e-mail or to open an existing e-mail (step 1104). The process then either creates a new e-mail (step 1106) or opens an existing e-mail (step 1108).

The process then presents an appropriate e-mail with a corresponding e-mail management interface (step 1110). The process then queries whether there are existing single touch buttons (step 1112). If yes, then the process receives a user selection of corresponding single touch buttons (step 1114). A user may decide to make edits of the setup of the single touch buttons (step 1116). If there are edits, then the process proceeds to receive the edits to the setup of the single touch buttons (step 1118).

If there are no edits, then the process proceeds to perform user applied e-mail operations (step 1124). After step 1118, the process proceeds to step 1124, where the process proceeds to perform user applied e-mail operations. The process terminates thereafter.

Returning to step 1112, if there are no existing single touch buttons, the process proceeds to allow a user to create single touch buttons (step 1120). In creating single touch buttons, a user may select the e-mail management preferences or settings included in a menu embodied in 404 in FIG. 4, 608 in FIG. 6, 702 in FIG. 7, such as, without limitation, quick settings 404 in FIG. 4, or quick settings menu 700 in FIG. 7. Thus, the process receives the selection from the user for the user's e-mail management preferences and then associates the e-mail management preferences to the single touch buttons.

The process then proceeds to receive customized settings on the e-mail management interface for e-mail operations (step 1122). The process then proceeds to perform user applied e-mail operations (step 1124). The process terminates thereafter.

The different illustrative embodiments may provide and/or facilitate increased productivity and organization for a user. Many people with a significant number of critical e-mails are often overwhelmed. Various solutions exist on how to manage e-mail. Oftentimes, these solutions include best practices or techniques to follow no matter what type of e-mail system a user operates.

For example, in order to increase organization, suggestions include that one should always take action on an e-mail and never leave the e-mail sitting in an in-box. Taking action could include answering, filing, archiving the e-mail for future reference, setting up a reminder about the e-mail, or deleting the e-mail.

With the illustrative embodiments provided herein, tools are presented to assist the user to manage his or her e-mail more efficiently using the single-touch buttons. The illustrative embodiments assist the user in achieving increased organization for his or her e-mail system and implementing the best practices previously discussed. The single-touch buttons provide the user with the option to archive, to establish reminders, and to sort relevant features to an e-mail as soon as a user has either initially read or composed an e-mail, without having to go through multiple steps and screens to complete these tasks.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a recordable-type computer-usable or computer-readable medium providing program code for use by or in connection with a computer or any instruction execution system. For the purposes of this description, a recordable-type computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for organizing e-mails, the computer-implemented method comprising:

creating a plurality of single touch buttons by receiving selections from a user for e-mail management preferences and associating the e-mail management preferences to the plurality of single touch buttons;

responsive to receiving a user input to perform an email action on a selected email, displaying the plurality of single touch buttons in association with the selected e-mail; and responsive to a selection of a single touch button from the plurality of single touch buttons, executing a plurality of operations associated with the single touch button on the selected e-mail, wherein the plurality of operations manipulate the selected e-mail, and wherein each one of the plurality of single touch buttons are operable to initiate execution of multiple operations associated with each respective one of the plurality of single touch buttons;

wherein performing the e-mail action on the selected e-mail comprises creation of a new e-mail, wherein the new e-mail contains an e-mail management interface comprising at least one of a date of expiration that is presented in a body of the new e-mail; and wherein the date of expiration further comprises receiving a determination whether the selected e-mail should be archived or deleted upon occurrence of the date of expiration.

2. The computer-implemented method of claim 1, further comprising:

responsive to receiving the selected e-mail belonging to a special project, receiving a selection for a corresponding single touch button for the special project.

3. The computer-implemented method of claim 1, wherein a quick settings menu is located as a drop down menu in a body of the selected e-mail.

4. The computer-implemented method of claim 3, wherein the quick settings menu further comprises options for either archiving or deleting the selected e-mail, any base e-mails, or thread e-mails.

5. The computer-implemented method of claim 3, wherein the quick settings menu located in the body of the selected e-mail further comprises a reminder checkbox for the user to set up dates to receive at least one reminder about the selected e-mail.

6. A computer program product stored on a non-transitory recordable-type computer readable medium for organizing e-mails, the computer program product comprising:

computer useable program code for creating a plurality of single touch buttons including computer useable program code for receiving selections from a user for e-mail management preferences and computer useable program code for associating the e-mail management preferences to the single touch buttons;

computer useable program code responsive to receiving a user input to perform an email action on a selected email, for displaying the plurality of single touch buttons in association with the selected e-mail; and computer useable program code responsive to a selection of a single touch button from the plurality of single touch buttons, for executing a plurality of operations associated with the single touch button on the selected e-mail, wherein the plurality of operations manipulate the selected e-mail, and wherein each one of the number of single touch buttons are operable to initiate execution of multiple operations associated with each respective one of the plurality of single touch buttons;

wherein performing the e-mail action on the selected e-mail comprises creation of a new e-mail, wherein the new e-mail contains an e-mail management interface comprising at least one of a date of expiration that is presented in a body of the new e-mail; and wherein the date of expiration further comprises receiving a determination whether the selected e-mail should be archived or deleted upon occurrence of the date of expiration.

7. The computer program product of claim 6 further comprising:

computer useable program code for determining whether to store the selected e-mail, reply to the selected e-mail, forward the selected e-mail, or create a draft of the selected e-mail for storing.

8. A data processing system for organizing e-mails, the data processing system comprising:

a bus system;

a memory connected to the bus system, wherein the memory includes computer useable program code; and a processing unit connected to the bus system, wherein the processing unit executes the computer usable program code:

to create the single touch buttons including receiving selections from a user for e-mail management preferences, and associating the e-mail management preferences to the single touch buttons;

to display the plurality of single touch buttons in association with the selected e-mail responsive to receiving a user input to perform an email action on a selected email; and to execute a plurality of operations associated with the single touch button on the selected e-mail, wherein the plurality of operations manipulate the selected e-mail responsive to a selection of a single touch button from the plurality of single touch buttons, and wherein each one of the number of single touch buttons are operable to initiate execution of multiple operations associated with each respective one of the plurality of single touch buttons;

wherein performing the e-mail action on the selected e-mail comprises creation of a new e-mail, wherein the new e-mail contains an e-mail management interface comprising at least one of a date of expiration that is presented in a body of the new e-mail; and wherein the date of expiration further comprises receiving a determination whether the selected e-mail should be archived or deleted upon occurrence of the date of expiration.

9. The data processing system of claim 8 further comprising:

determining whether to store the selected e-mail, reply to the selected e-mail, forward the selected e-mail, or create a draft of the selected e-mail for storing.

* * * * *